(12) United States Patent
Wang (10) Patent No.: US 8,422,189 B2
(45) Date of Patent: Apr. 16, 2013

(54) SERIALLY CONNECTED SURGE SUPPRESSION OPTIMIZATION DEVICE

(75) Inventor: Chih-Hua Wang, Taipei (TW)

(73) Assignee: Anmax Lightning Technology Corp., Taipei (TW)

( * ) Notice: Subject to any disclaimer, the term of this patent is extended or adjusted under 35 U.S.C. 154(b) by 379 days.

(21) Appl. No.: 12/792,730

(22) Filed: Jun. 2, 2010

(65) Prior Publication Data

US 2011/0299210 A1    Dec. 8, 2011

(51) Int. Cl.
*H01C 7/12*   (2006.01)
*H02H 1/00*   (2006.01)
*H02H 1/04*   (2006.01)
*H02H 3/22*   (2006.01)
*H02H 9/06*   (2006.01)

(52) U.S. Cl.
USPC .......................................................... 361/118

(58) Field of Classification Search .................. 361/117, 361/118
See application file for complete search history.

(56) References Cited

U.S. PATENT DOCUMENTS

| | | | | |
|---|---|---|---|---|
| 3,514,720 A | * | 5/1970 | Roucache et al. | 332/168 |
| 4,677,518 A | * | 6/1987 | Hershfield | 361/56 |
| 5,388,021 A | * | 2/1995 | Stahl | 361/56 |
| 6,137,880 A | * | 10/2000 | Bella | 379/399.01 |
| 7,589,947 B2 | * | 9/2009 | Terada | 361/111 |
| 2002/0024788 A1 | * | 2/2002 | Lestician | 361/111 |
| 2009/0073618 A1 | * | 3/2009 | Wang | 361/56 |

* cited by examiner

*Primary Examiner* — Rexford Barnie
*Assistant Examiner* — Christopher Clark (57) ABSTRACT

A serially connected surge suppression optimization device has an input terminal, an output terminal, a plurality of surge suppression units. The surge suppression units are serially mounted between the input terminal and the output terminal. Each surge suppression unit has at least one pair of parallel inductors and a plurality of surge absorption units respectively connected with one end of each of the pair of inductors. The pair of parallel inductors mounted in the surge suppression unit in a pre-stage and the surge suppression unit in a post-stage have different conductance values. Accordingly, the surge suppression optimization device connected in a path from which surges pass can significantly reduce energy of a surge flowing in and a residual surge voltage. The different conductance values of the surge suppression units in a pre-stage and a post-stage smoothen an intruding surge to secure better safety protection without abruptly generating a peak rise.

15 Claims, 13 Drawing Sheets

SERIALLY CONNECTED SURGE SUPPRESSION OPTIMIZATION DEVICE

FIELD OF THE INVENTION

The present invention is related to a serially connected surge suppression optimization device, and more particularly to a serial suppression optimization device suppressing intruding surge to be mitigated without generating abrupt rise of waveform so as to acquire better safety protection, further modify output power and effectively improve power supply quality.

BACKGROUND OF THE INVENTION

Irregular interference or malfunction of equipment is mainly caused by lighting surge, switching surge and electromagnetic pulse. Usually, the three types of surge interference sources intrude through (1) power circuit, (2) signal circuit (control circuit) and (3) grounding circuit. If handing surge energy and discharge current with insufficient capability or an inadequate approach, equipment is prone to faults or interferences. Accordingly, a multitude of existing electronic equipment, communication equipment, control equipment and power equipment is additionally equipped with a surge suppression device to alleviate faults of equipment or interferences to equipment.

Figure 10:
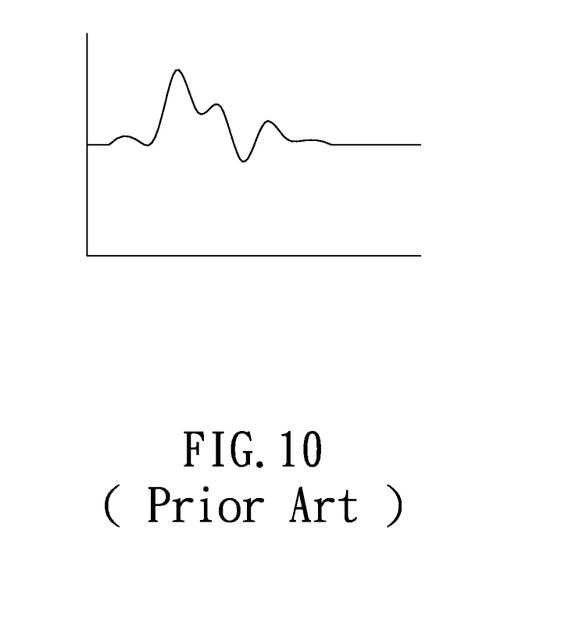
FIG. 10 is a suppressed surge waveform of a conventional surge suppression optimization device.

Despite a nature of conventional surge suppression devices capable of absorbing transient overvoltage, in-rush current and high energy, surge voltage can usually go up to hundreds of KV and current can go up to tens of KV. Moreover, the surge waveform rise time is just several μs and the lasting duration is tens of μs. Regardless of surges induced from flashover discharge between thunder clouds and flashover discharge between thunder cloud and earth or switching surge resulting from operation of power equipment, with reference to FIG. 10, the resulting energy of surge is accumulated to a sinusoidal power waveform of a power supply. This leads to the occurrence of spike distortion on the power waveform. Such waveform containing spikes puts electrical equipment having insulation design in the risk of immediate insulation degradation.

Conventional serially connected surge suppression devices have no counter design, thereby failing to learn the count of the serially connected surge suppression devices struck by surges or electromagnetic pulses. Besides, conventional serially connected surge suppression devices have no load sharing design. Once encountering special requirement having multiple surge suppression devices operated in parallel to increase load current, each parallelly connected surge suppression device easily appears to be overloading due to uneven load sharing. Such overloading phenomenon causes the parallelly connected surge suppression devices to burn down one by one, thus failing the post-stage equipment in connection to operate with normal power supply due to tripping of circuit breaker and power failure.

Furthermore, conventional serially connected surge suppression devices have no functions associated with automatic overload protection, display, automatic shunting detection recovery and the like. When the surge suppression devices are serially mounted in regular public equipment, such as road traffic signal box, builders often connect heavy construction equipment with the regular public equipment to forcibly acquire power from the public equipment. As a consequence, the serially connected surge suppression devices are overloaded and burned out. When serially applied to certain critical public equipment, such as site of telecommunication system or power supply system, the surge suppression devices can surely absorb surge and automatically disconnect from the critical public equipment once being struck by surge. However, the entire public equipment is easily shut down for sake of power failure and fails to function normally.

Also, to prevent intrusion of foreign matter, vandalism, inadvertent contact or destruction of circuits and components from affecting absorption of surge, conventional serially connected surge suppression devices are usually coated with a resin protection layer. Whereas, as surge suppression components need to withstand and absorb high-voltage current, high voltage easily accompanies with high temperature so that the surge suppression components equipped with the resin protection layer makes heat dissipation inferior and constant temperature rise of circuits degrades operational functionality and is even burned down when it goes from bad to worse.

SUMMARY OF THE INVENTION

In view of the foregoing drawbacks of conventional serially connected surge suppression devices, a main objective of the present invention is to provide a serially connected surge suppression optimization device having an input terminal, an output terminal and a plurality of surge suppression units.

The plurality of surge suppression units are serially mounted between the input terminal and the output terminal, and have at least one pair of parallel inductors and a plurality of surge absorption units respectively connected with one rear end of each of the pair of inductors.

The pair of parallel inductors mounted in the surge suppression unit in a pre-stage and the surge suppression unit in a post-stage have different conductance values. The plurality of surge suppression units and the parallel inductors mounted in the surge suppression units in the pre-stage and the post-stage having different conductance values significantly reduce energy of a surge flowing in the input terminal, reduce a residual surge voltage, secure a more smooth suppressed surge waveform and obtain better safety protection result without generating sudden rise of peak.

The surge suppression optimization device of the present invention further has a surge phase correction compensation loop connected with the output terminal and using high-speed semiconductor components for active surge absorption and a filtering mode adopting asynchronous surge suppression and dynamic pulse adjustment to transform energy of intruding surges and further correct the power waveform distortion caused by surges and harmonics, so as to effectively improve quality of power supply.

Besides, the serially connected surge suppression optimization device of the present invention is further equipped with practical functions of load sharing, automatic overload protection, display and automatic shunting detection recovery and the like so as to explore more enhanced safety protection effect when applied to various equipment.

The foregoing and other features and advantages of the present invention will be more clearly understood through the following descriptions with reference to the drawing, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1:
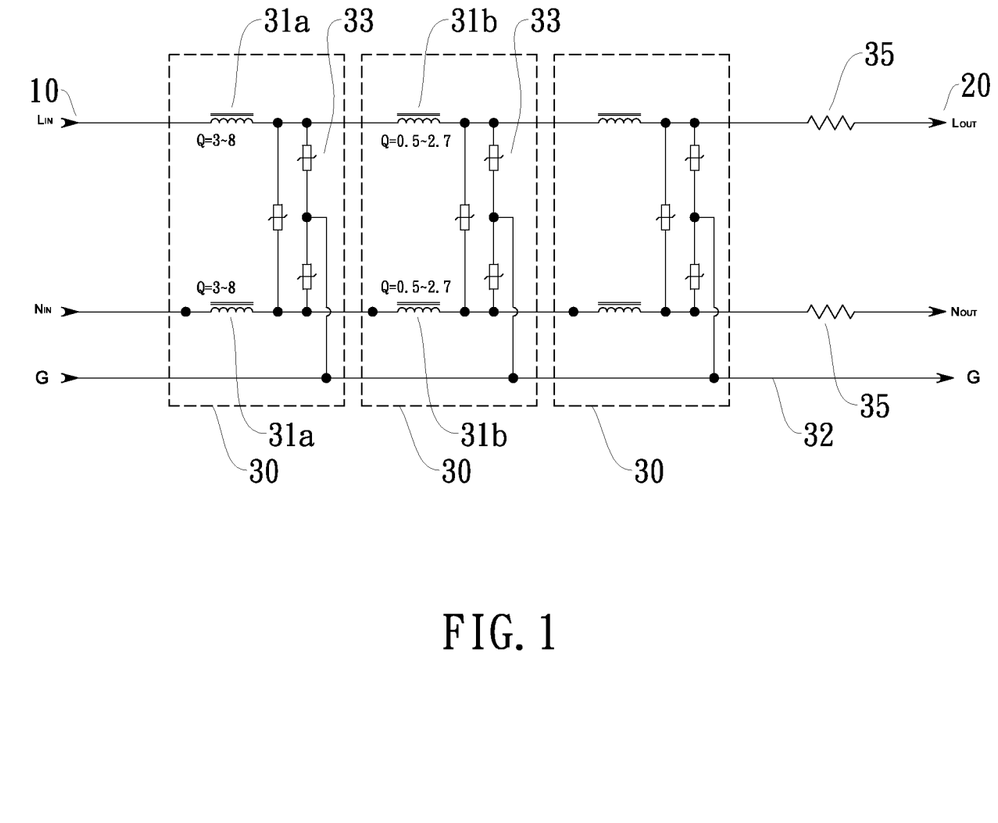
FIG. 1 is a circuit diagram of a serially connected surge suppression optimization structure in accordance with the present invention.

With reference to FIG. 1, a serially connected surge suppression optimization device 1 in accordance with the present invention has an input terminal 10, an output terminal 20 and a plurality of surge suppression units 30.

The plurality of surge suppression units 30 are serially mounted between the input terminal 10 and the output terminal 20, and at least two surge suppression units 30 are serially connected. Each surge suppression unit 30 has at least two parallel inductors 31a, 31b and three surge absorption units 33. Each surge absorption unit 33 is connected with a rear end of each of the two inductors 31a, 31b and a ground 32.

The parallel inductors 31a, 31b mounted in the surge suppression units 30 in a pre-stage and in a post stage have different conductance values. For example, the parallel inductors 31a mounted in the surge suppression unit 30 in the pre-stage have a medium conductance value range (Q=3~8), and the parallel inductors 31b mounted in surge suppression unit 30 in the post-stage have a low conductance value range (Q=0.5~2.7).

Figure 2:
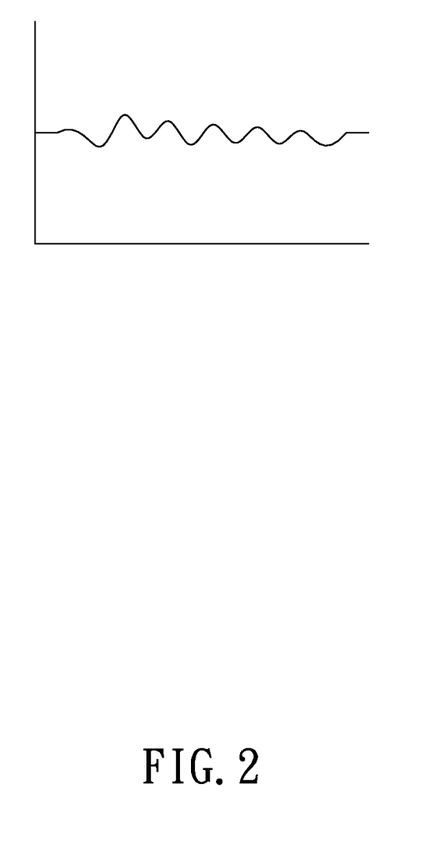
FIG. 2 is a suppressed surge waveform of the serial suppression optimization device in FIG. 1.

As shown in the application in FIG. 1, when the serially connected surge suppression optimization device 1 is connected to a path of a power system, a communication system or other important equipment through which surges pass to significantly reduce energy of a surge flowing in the surge suppression optimization device 1 and lower a residual surge voltage. Given a low-pass effect generated by the parallel inductors 31a having a medium conductance value range (Q=3~8) and mounted in a surge suppression unit 30 in a pre-stage, a high frequency portion (1 MHz~4 MHz) of an intruding surge is attenuated. Given a high-pass effect generated by the parallel inductors 31b having a low conductance value range (Q=0.5~2.7) in a surge suppression unit 30 in the post-stage, low-frequency surge interference between 10 kHz to 2 MHz is attenuated to secure a more smooth suppressed surge waveform and better safety protection result without generating sudden rise of peak (as shown in FIG. 2).

Besides, each part of the serially connected surge suppression optimization device 1 can further has various reinforced optimization protection means to prevent product of the serially connected surge suppression optimization device 1 from generating electromagnetic interference in operation and to make operating condition safer when subjected to various loads.

Figure 3A:
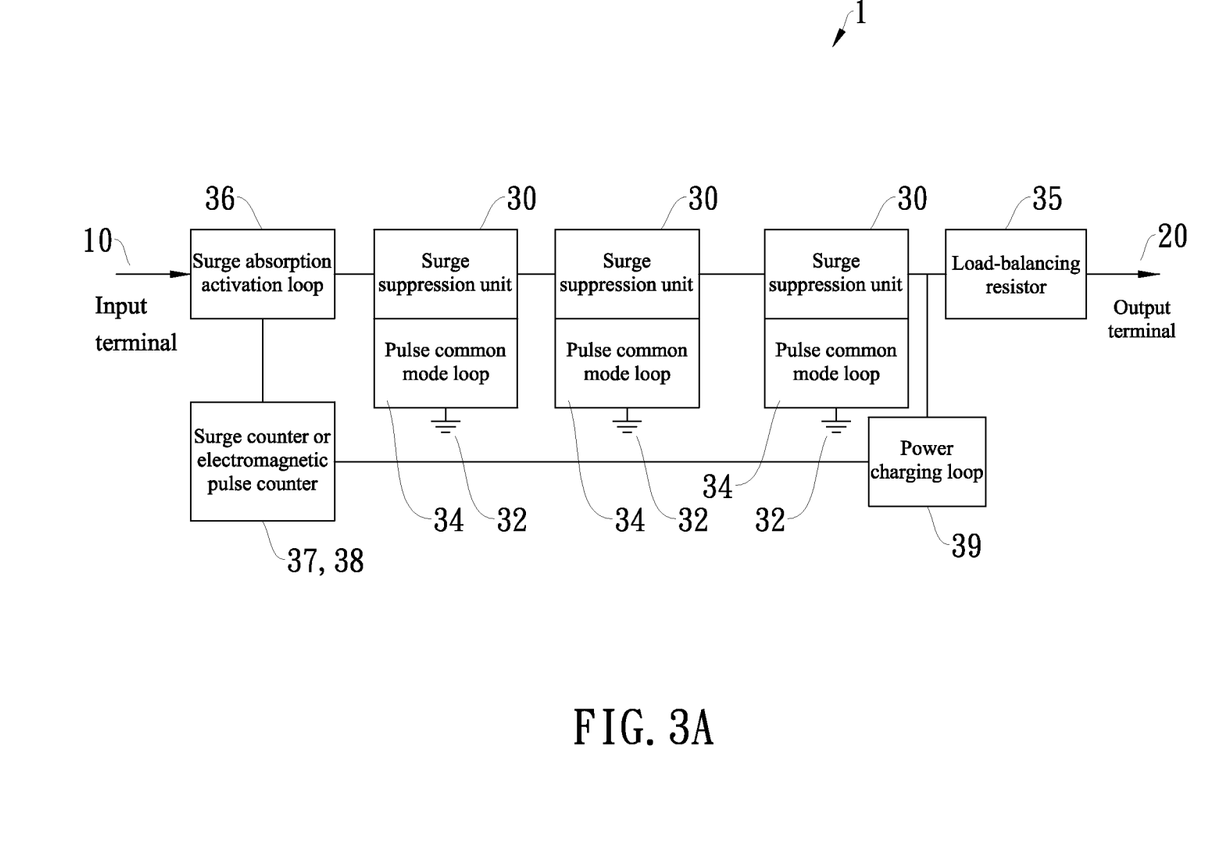
FIG. 3A is a block diagram of the serially connected surge suppression optimization device having additional reinforced optimization devices.
Figure 3B:
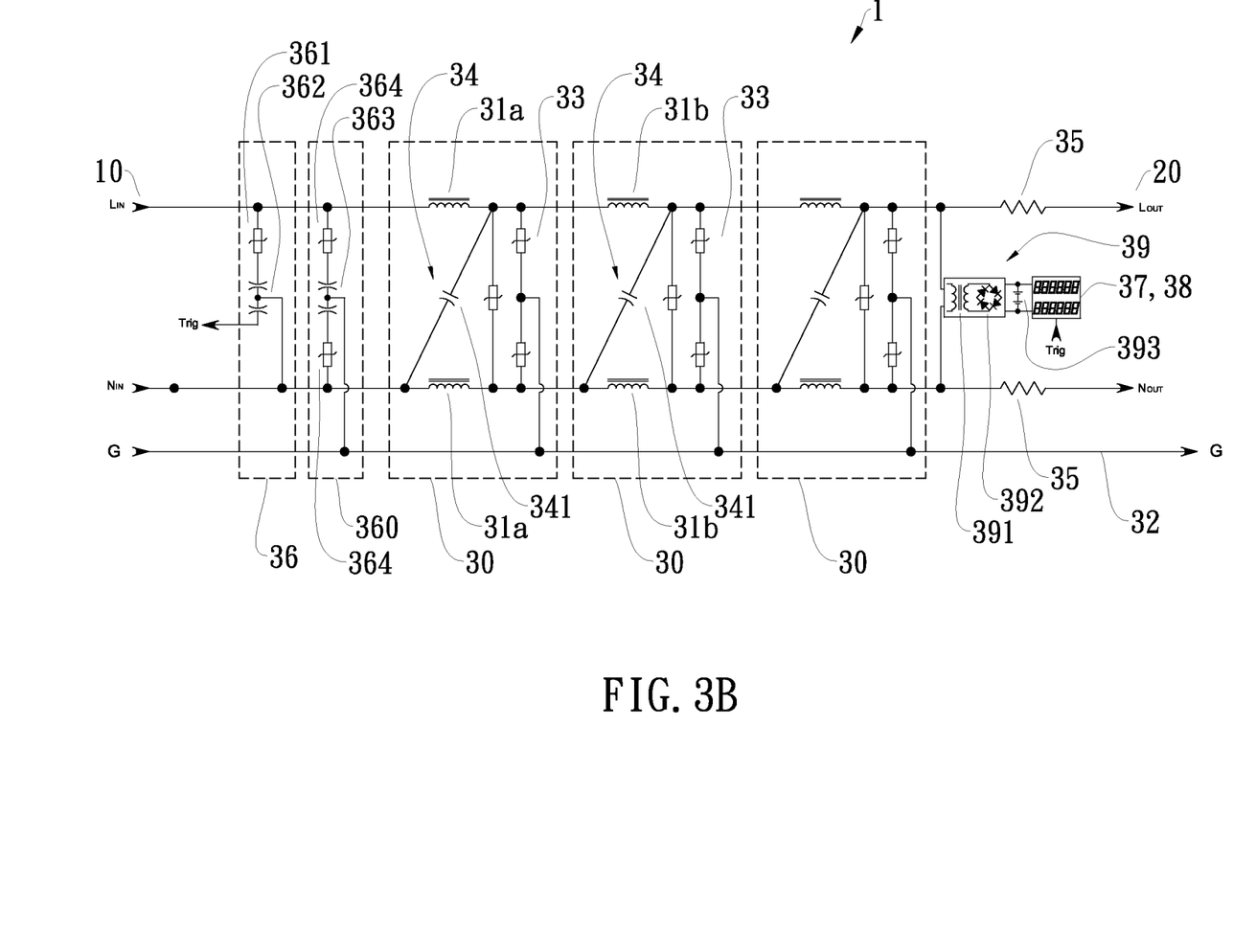
FIG. 3B is a circuit diagram of the serial suppression optimization device in FIG. 3A.

For example, as shown in FIGS. 3A and 3B, in addition to pure lighting surge, types of surge also include electromagnetic pulse originated from switching operation and received by power supply of equipment. Therefore, a surge suppression unit 30 has a pulse common mode loop 34 additionally mounted therein and composed of a capacitor 341 diagonally connected with different terminals of the two parallel inductors 31a or 31b so as to eliminate or reduce electromagnetic pulses generated when the surge suppression unit 30 discharges energy and to effectively avoid energy impact on post-stage equipment accordingly.

Figure 4:
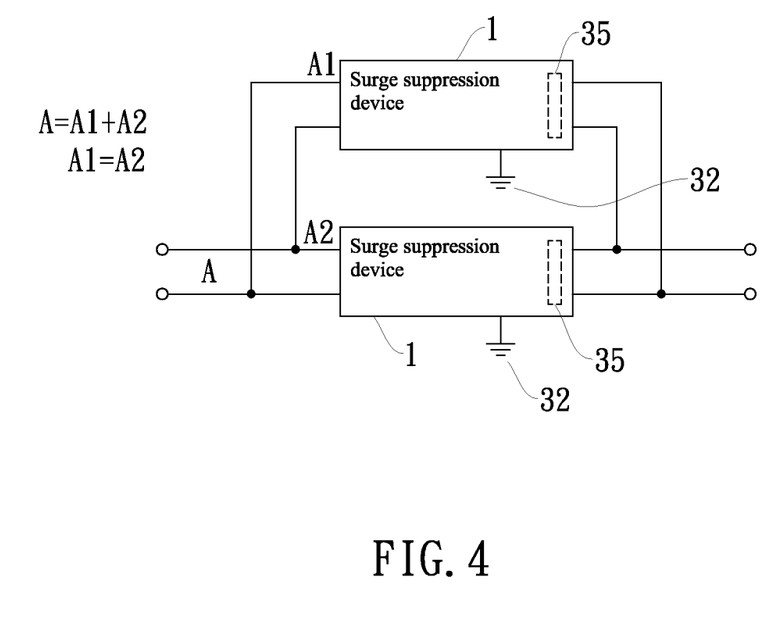
FIG. 4 is a block diagram of the serially connected surge suppression optimization devices parallelly connected for even load sharing.

A load-balancing resistor 35 having a low resistance value is further mounted to connect with an output terminal of the plurality of surge suppression units 30 so that multiple surge suppression optimization devices 1 constructed by the surge suppression units are parallelly connected as shown in FIG. 4 to approach consistent electrical characteristic internally. Each surge suppression optimization device 1 can evenly share a total current of a post-stage equipment to enhance safety protection capability, thereby effectively lowering a risk of burning down the parallelly connected conventional surge suppression devices because of uneven current sharing arising from inconsistent internal impedances of the conventional surge suppression devices.

As far as surge characteristic is concerned, for sake of load effect of a post-stage load, the surge suppression optimization device 1 fails to fully control intruding surges. In view of this, with reference to FIGS. 5A and 5B, an output terminal 20 of the surge suppression optimization device 1 is connected to a surge phase correction compensation loop 40 mainly using high-speed semiconductor components for active surge absorption and including a bridge diode 41 to detect phase of surge. The bridge diode 41 is connected with a plurality of passive components, such as resistor and capacitor, and is further connected to a silicon control rectifier (SCR) 43 through an inductor 42 for adjusting shunting phase of pulse to serve as a large shunting protection means of surge. The SCR 43 is activated to charge a capacitor 44. One end of the capacitor 44 is connected to a MOSFET 45. When the capacitor 44 is charged up to a capacity and is open-circuited, the MOSFET 45 is activated and short-circuited so that the capacitor 44 discharges at a high rate.

Figure 5A:
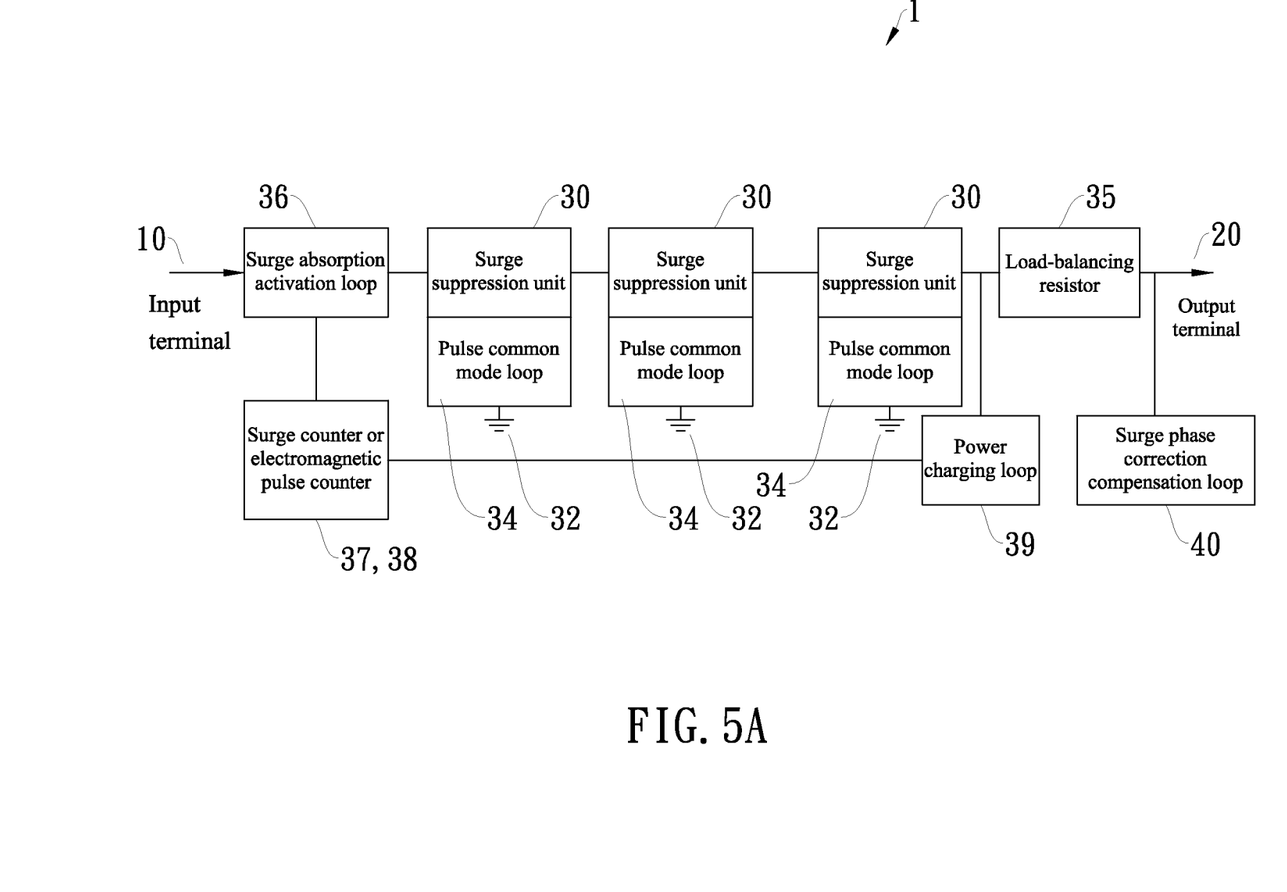
FIG. 5 is a block diagram of the serially connected surge suppression optimization device having an additional surge phase correction compensation loop.
Figure 5B:
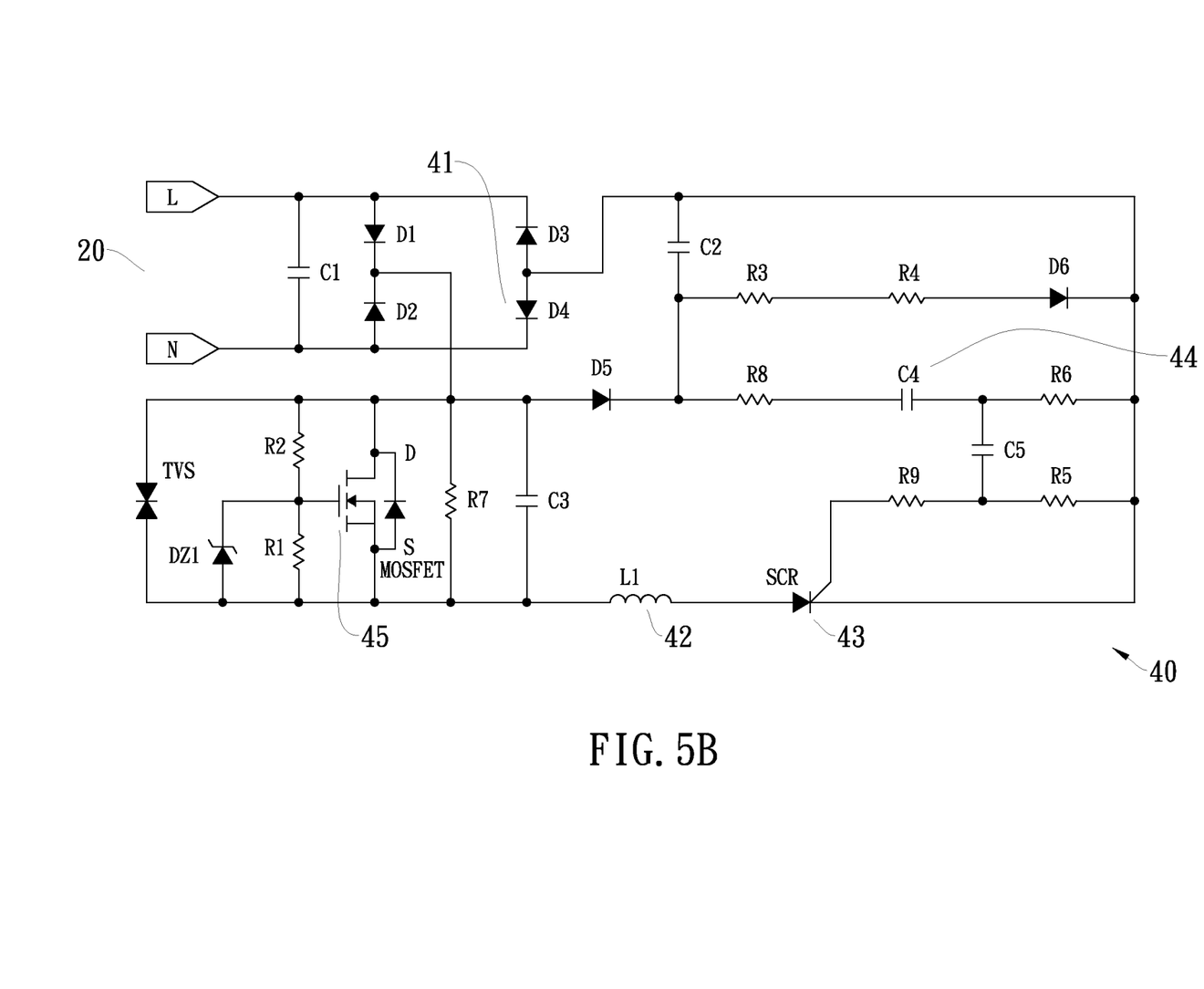
FIG. 5B is a circuit diagram of the surge phase correction compensation loop in FIG. 5.

After surge pulses intrude and charge the capacitor 44 up to 30V, the capacitor 44 has appeared to be open and failed to shunt larger pulses. At the moment, the MOSFET 45 is just activated to perform a short-circuit discharge, enabling the capacitor 44 to discharge at a high rate and allowing the SCR 43 to maintain longer pulse waveform protection. Moreover, when the MOSFET 45 is short-circuited, given a low-impedance state between the drain and source of the MOSFET 45, the energy of the capacitor 44 is dissipated through heat generated by short circuit. When the surge pulses disappear, the SCR 43 turns to be disconnected, the capacitor 44 is not in a state of storing energy either and the MOSFET 45 also appears to be open-circuited. Such filtering mode adopting asynchronous surge suppression and dynamic pulse adjustment will transform energy of intruding pulses, and the corrected output power waveform approaches more to a standardized sinusoidal wave.

Upon being implemented, the number (or class) of the MOSFET 45 and the SCR 43 inside the surge phase correction compensation loop 40 can be adapted or customized to different designs with single chip or multiple chips (not shown) depending on the type of protection equipment in which the MOSFET 45 and the SCR 43 are mounted. In addition to the application adopting one surge suppression optimization device 1 collaborated with one surge phase correction compensation loop 40 as shown in FIGS. 5A and 5B in operation, an output terminal of multiple surge suppression optimization devices 1 can be further commonly collaborated with an identical surge phase correction compensation loop 40 (not shown), making the application of the surge suppression optimization device 1 more versatile in combination with other devices for fulfillment of various practical demands.

With further reference to FIGS. 3A and 3B, an input terminal of the serially connected surge suppression units 30 is connected with a surge counter 37 or an electromagnetic pulse counter 38 through a surge absorption activation loop 36. The surge absorption activation loop 36 has a surge absorption component 361 connected with the input terminal 10 and a lighting rod 362 serially connected with the surge absorption component 361. The surge counter 37 or the electromagnetic pulse counter 38 has a power charging loop 30 acquiring power from an output terminal of the serially connected surge suppression units 30 and is composed of a transformer 391, a bridge rectifier 392 and a durable rechargeable battery 393.

Accordingly, for the application of the surge suppression optimization device, once an intruding surge or electromagnetic pulse is detected from the input terminal 10 or the ground 32 and a level thereof is higher than a clamping voltage of the surge absorption activation loop 36, the surge absorption activation loop 36 is activated to discharge so that the surge or electromagnetic pulse signal can be clearly displayed on the surge counter 37 or the electromagnetic pulse counter 37 to respectively record a count of intruding surges or electromagnetic pulses.

Meanwhile, the count of intruding surges or electromagnetic pulses displayed on the surge counter 37 or the electromagnetic pulse counter 38 can be transmitted to a computer through a signal output interface complying with a communication protocol, such as RS-232, RS-485 or the like so as to perform remote monitoring and control in collaboration with large-scale monitoring system.

Besides, what is worth mentioning is that the surge suppression optimization device 1 charges the durable rechargeable battery 393 in the surge counter 37 or the electromagnetic pulse counter 38 under a normal operation since the surge counter 37 and the electromagnetic pulse counter 38 adopt the power charging loop 39. Once the surge suppression optimization device 1 is shut down due to a tripped circuit breaker, the durable rechargeable battery 393 supplies power to the surge counter 37 or the electromagnetic pulse counter 38 to keep memorizing the count values displayed thereon.

With reference to FIG. 3B, the input terminal of the serially connected surge suppression units 30 is further connected with a surge and electromagnetic pulse absorption and discharge loop 360 which is composed of a lighting rod 363 having a center portion connected to ground, and two ends respectively and serially connected with a surge absorption component 364 and further respectively connected with two parallel inductors 31a.

Figure 6A:
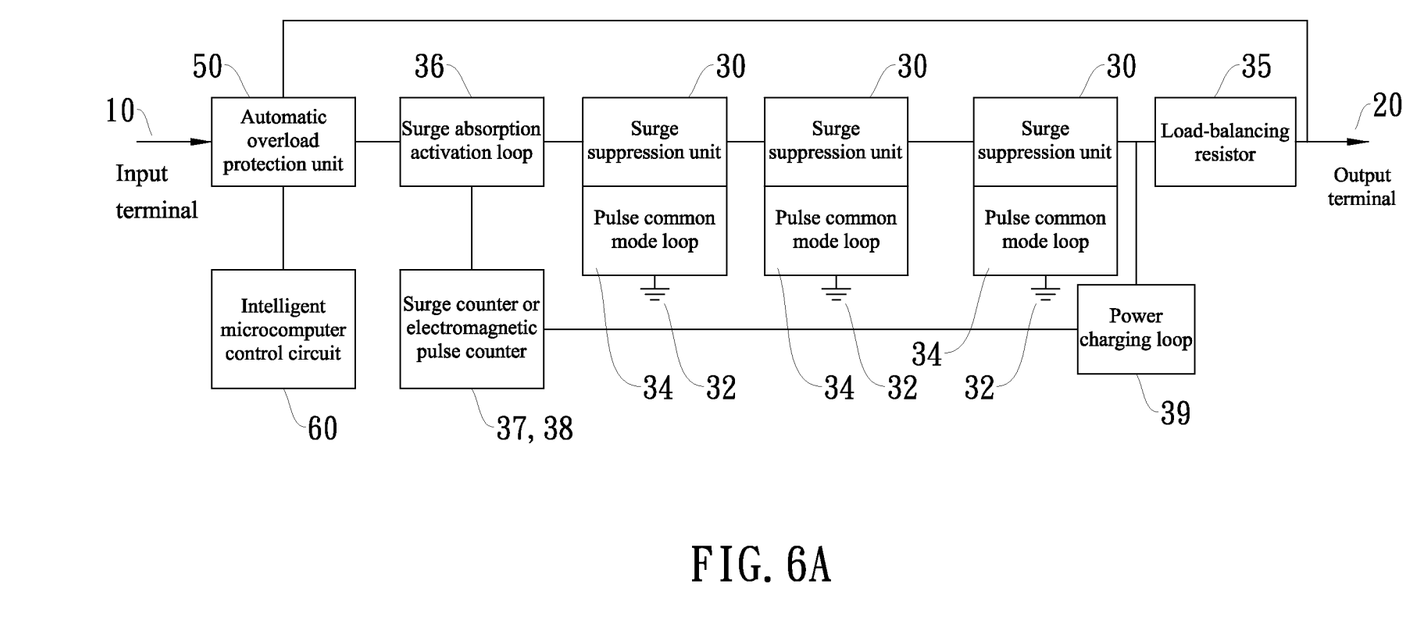
FIG. 6A is a block diagram of a serially connected surge suppression optimization device having an automatic overload protection unit.
Figure 6B:
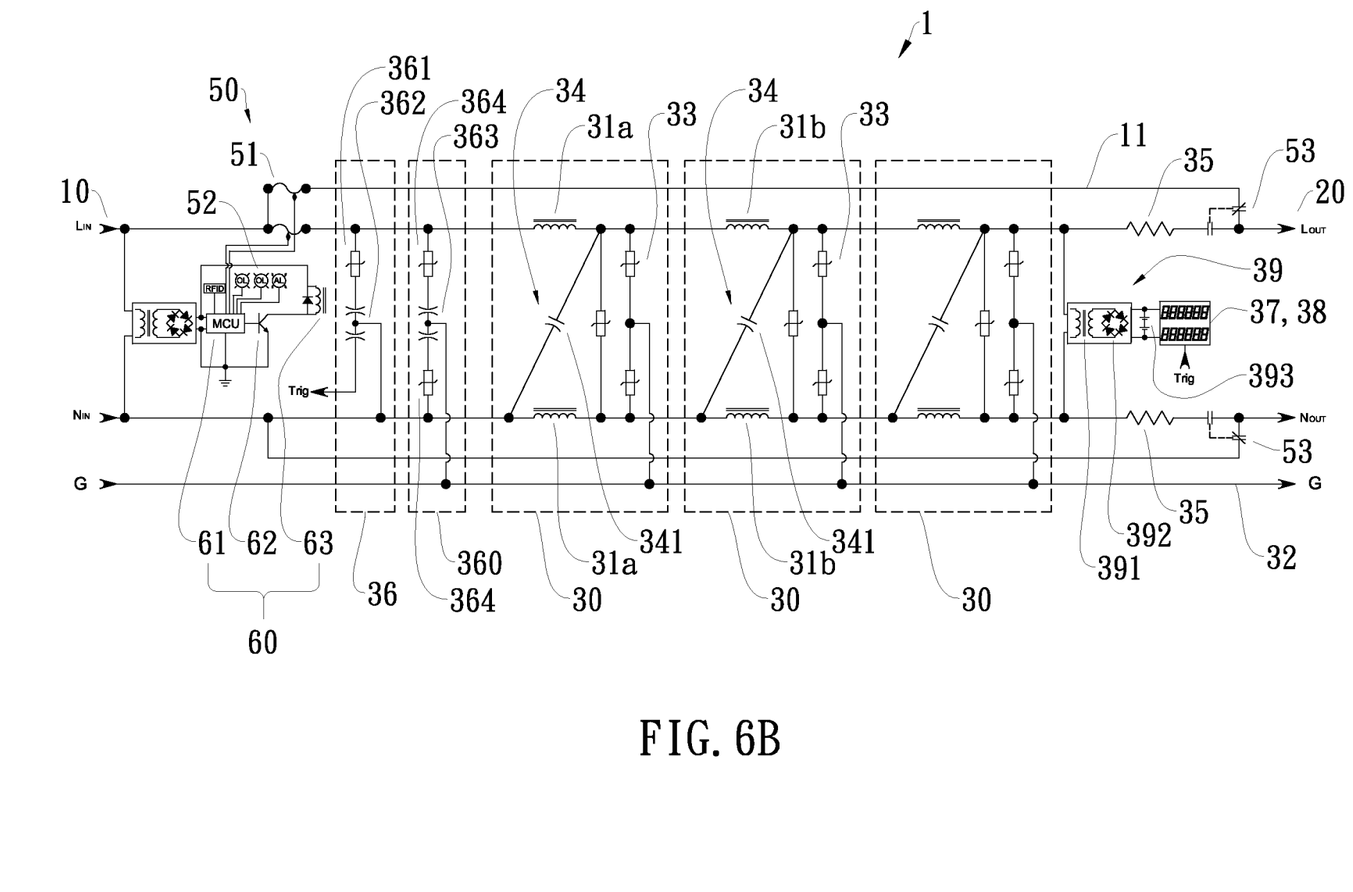
FIG. 6B is a circuit diagram of the serially connected surge suppression optimization device in FIG. 6A.

With reference to FIGS. 6A and 6B, upon being implemented, the surge suppression optimization device 1 further has an automatic overload protection unit 50. The automatic overload protection unit 50 has an automatic recovery protection fuse switch 51 serially connected between the input terminal 10 and a shunting line 11, a status indicator 52 and a change-over contact 53 connected with the output terminal 20 and the shunting line 11. The automatic overload protection unit 50 further has an intelligent micro-computer control circuit 60. The intelligent micro-computer control circuit 60 has a micro-controller unit (MCU) 61 connected with the automatic recovery protection fuse switch 51, the status indicator 52, a control chip 62 and a relay loop 63.

As the automatic over load protection unit 50 is additionally mounted to the input terminal 10 of the surge suppression optimization device 1, power can smoothly pass through a plurality of surge suppression units 30 to post-stage equipment when the surge suppression optimization device 1 is operated in a normal condition. Once the post-stage equipment is overloaded or short-circuited, current of the post-stage equipment exceeds a rated range (for example, 15A). The automatic overload protection unit 50 of the surge suppression optimization device 1 will initiate a temperature monitoring state by virtue of its temperature setting value and a time sequence control function. Once the configured tripping temperature value is reached, the automatic overload protection unit 50 will cut off a normal power supply circuit supplying power to the plurality of surge suppression control units 30 and switch over to the post-stage equipment in connection through a shunting line 11 so as to constantly supply power to the post-stage equipment, and then disconnect from the original power supply circuit for overload protection of the automatic overload protection unit 50 and the post-stage equipment. Meanwhile, the status indicator 52 is lit to indicate a power tripping state. When the overload status is not reset by an equipment user, the automatic overload protection unit 50 will stay on to warn the equipment user to reset the overload status.

As for the additionally mounted intelligent microcomputer control circuit 60, when the automatic power tripping protection of the surge suppression optimization device triggered by an overloading or short-circuited condition of the post-stage equipment and the irregular condition is not corrected, the automatic overload protection unit 50 will switch back to the normal power supply loop shortly through temperature detection of the intelligent microcomputer control circuit 60 so that an uninterrupted power supply mode alternatively switching between normal power supply circuit and the shunting line 11 is repeated. Meanwhile, the status indicator 52 for power mode keeps toggling between its indication modes to urge user to eliminate the overloading or short-circuited condition of the post-stage equipment. After the overloading or short-circuited condition is eliminated, the automatic overload protection unit 50 will be driven based on a preset temperature level to automatically restore the normal power supply mode with the time sequence control function.

The characteristics of such design can be applied to equipment allowing no power interruption at all to reduce the possibility of burning out the serially connected surge suppression optimization device 1 due to overload or short circuit of the post-stage equipment and to effectively lower the loss caused by short-term power supply interruption at the same time.

Figure 7A:
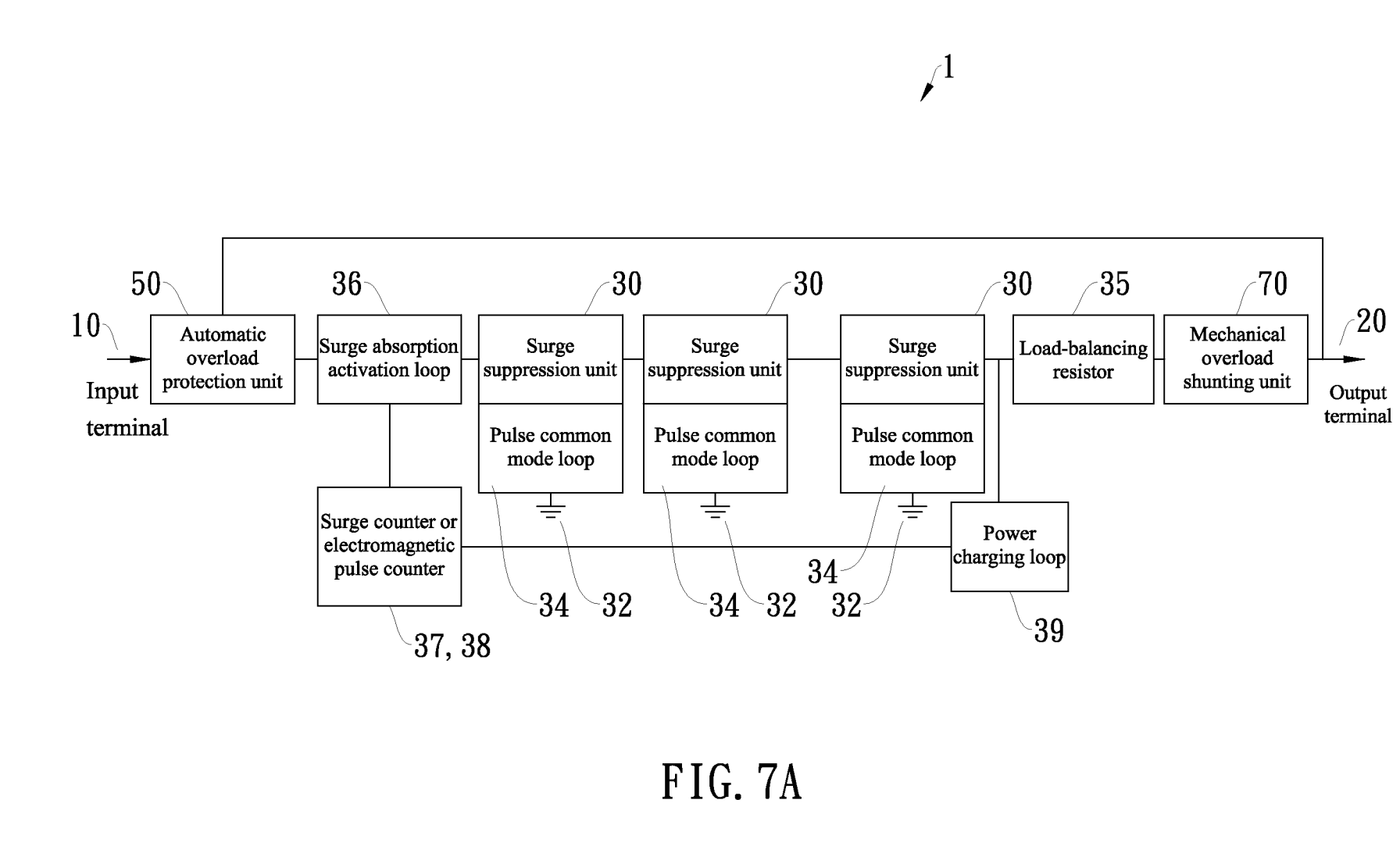
FIG. 7A is a block diagram of the serially connected surge suppression optimization device having a mechanical overload shunting unit.
Figure 7B:
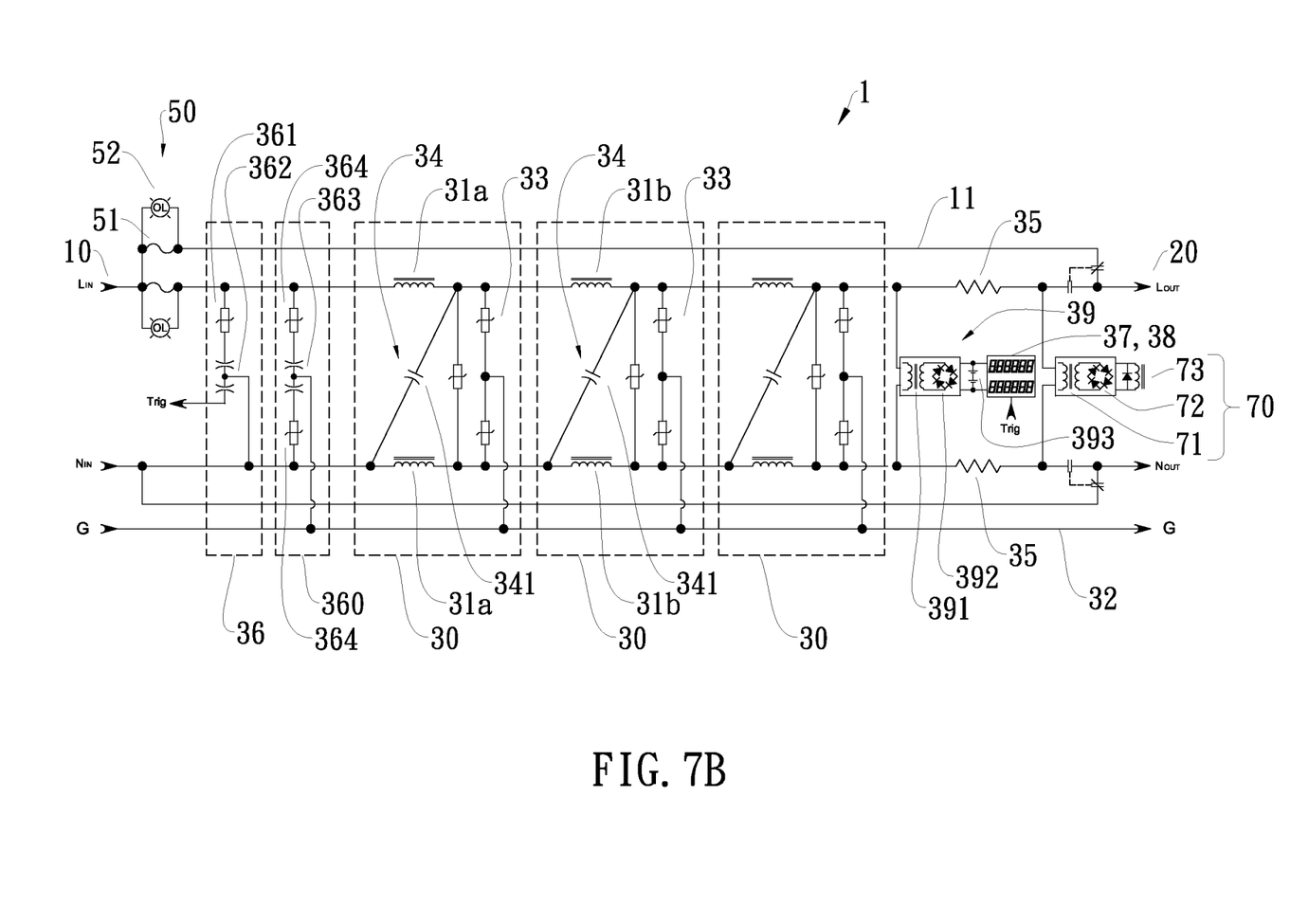
FIG. 7B is a circuit diagram of the serially connected surge suppression optimization device in FIG. 7A.
Figure 8:
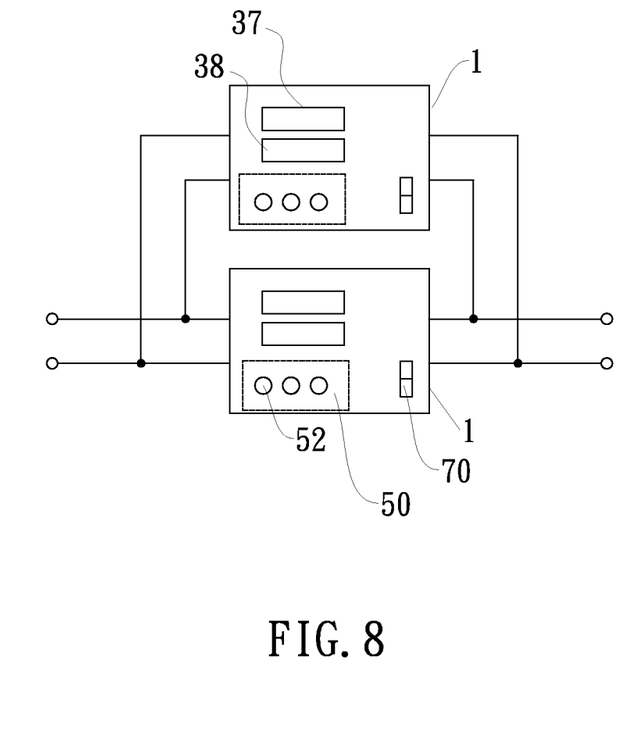
FIG. 8 is a schematic view of the serially connected surge suppression optimization devices integrated for overload protection.

Besides, with reference to FIGS. 7A, 7B and 8, the output terminal of the plurality of serially connected surge suppression optimization units 30 is further connected with a mechanical overload shunting unit 70. The mechanical overload shunting unit 70 has a transformer 71, a bridge rectifier 72 and a relay 73 receiving power from the bridge rectifier 72. The mechanical overload shunting unit 70 can be applied to regular equipment allowing brief power interruption and manual starting, thereby reducing the possibility of burning out the surge suppression optimization device 1 due to overload or short circuit of the post-stage equipment and reducing the loss caused by long-term power supply interruption at the same time.

Figure 9:
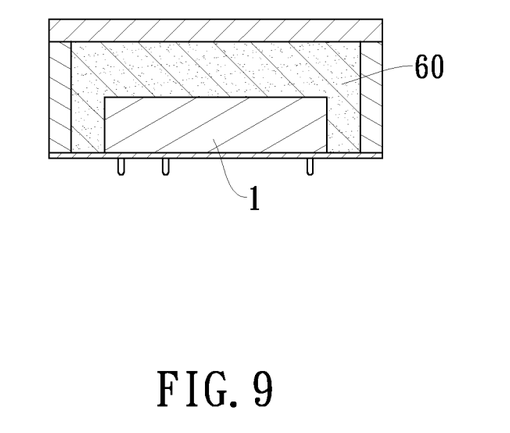
FIG. 9 is a schematic view of the serially connected surge suppression optimization device sheathed with high heat-conducting layer.

Furthermore, with reference to FIG. 9, the surge suppression optimization device 1 of the present invention further has an externally mounted resin sheath layer 80 mixed with carborundum and having a high heat-conducting property so that heat generated by the surge suppression optimization device 1 as a result of hysteresis effect and conductor factor can be uniformly dissipated to the surface of the surge suppression optimization device 1 through the sheath layer 80 to enhance performance of heat dissipation.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar devices.

What is claimed is:

1. A serially connected surge suppression optimization device, comprising:
    an input terminal;
    an output terminal; and
    a plurality of surge suppression units serially mounted between the input terminal and the output terminal, and having at least one pair of parallel inductors and a plurality of surge absorption units respectively connected with a rear end of each of the pair of inductors;
    wherein the pair of parallel inductors mounted in the surge suppression unit in a pre-stage and the pair of parallel inductors mounted in the surge suppression unit in a post-stage have different conductance values, the plurality of surge suppression units and the parallel inductors mounted in the surge suppression units in the pre-stage and the post-stage having different conductance values to reduce energy of a surge flowing in the input terminal, and to reduce a residual surge voltage;
    wherein the parallel inductors mounted in the surge suppression unit in the pre-stage have a medium conductance value range and the parallel inductors mounted in the surge suppression unit in the post-stage have a low conductance value range.

2. The serially connected surge suppression optimization device as claimed in claim 1, wherein each surge absorption unit further has a pulse common mode loop formed by a capacitor diagonally connected with different ends of the parallel inductors.

3. The serially connected surge suppression optimization device as claimed in claim 2, wherein an output terminal of the plurality of serially connected surge suppression units is connected with a load-balancing resistor.

4. The serially connected surge suppression optimization device as claimed in claim 3, comprising two serially connected surge suppression units, each surge suppression unit having the two parallel inductors and three surge absorption units connected with the rear end of each of the two inductors and a-ground.

5. The serially connected surge suppression optimization device as claimed in claim 3, further comprising a surge phase correction compensation loop connected with the output terminal and having a bridge diode connected to a plurality of passive components and further connected to a silicon control rectifier through an inductor for adjusting a shunting phase of a pulse to charge a capacitor, wherein one end of the capacitor is connected with a MOSFET that is activated and short-circuited so that the capacitor discharges at a high rate.

6. The serially connected surge suppression optimization device as claimed in claim 5, wherein the MOSFET and the silicon control rectifier inside the surge phase correction compensation loop are combined in a form of multiple chips and multiple classes.

7. The serially connected surge suppression optimization device as claimed in claim 5, wherein the surge phase correction compensation loop is mounted to take a one-to-many form and commonly connect with an output terminal of multiple surge suppression optimization devices.

8. The serially connected surge suppression optimization device as claimed in claim 3, wherein the input terminal of the plurality of surge suppression units is further connected with a surge counter or an electromagnetic pulse counter through a surge absorption activation loop.

9. The serially connected surge suppression optimization device as claimed in claim 8, wherein a count of intruding surges recorded by the surge counter or the electromagnetic pulse counter is adapted to transmit to a computer through a signal output interface complying with RS-232, RS-485 or related communication protocols.

10. The serially connected surge suppression optimization device as claimed in claim 8, wherein the surge counter or the electromagnetic pulse counter has a power charging loop acquiring power of the output terminal of the plurality of surge suppression units and formed by a transformer, a bridge rectifier and a rechargeable battery, and the surge absorption activation loop has a surge absorption component connected with the input terminal and a lightning rod serially connected with the surge absorption component.

11. The serially connected surge suppression optimization device as claimed in claim 8, wherein the input terminal of the plurality of surge suppression units is connected with a surge and electromagnetic pulse absorption and discharge loop formed by a lightning rod having two ends respectively and serially connected with a surge absorption component and further respectively connected with a front end of each of the two parallel inductors.

12. The serially connected surge suppression optimization device as claimed in claim 3, further comprising an automatic overload protection unit having an automatic recovery protection fuse switch serially connected between the input terminal and a shunting line, a status indicator and a change-over contact connected with the output terminal and the shunting line.

13. The serially connected surge suppression optimization device as claimed in claim 12, wherein the automatic overload protection unit further comprises a micro-computer control circuit having a MCU connected with the automatic recovery protection fuse switch, the status indicator, a control chip and a relay loop.

14. The serially connected surge suppression optimization device as claimed in claim 12, wherein the output terminal of the plurality of serially connected surge suppression optimization units is further connected with a mechanical overload shunting unit having a transformer, a bridge rectifier and a relay receiving power from the bridge rectifier.

15. The serially connected surge suppression optimization device as claimed in claim 1, further comprising a resin sheath layer mounted externally and mixed with carborundum.

* * * * *